US012615005B2

(12) United States Patent
McPheeters

(10) Patent No.: US 12,615,005 B2
(45) Date of Patent: Apr. 28, 2026

(54) SURFACE MOUNT ASSEMBLIES FOR A SOLAR PANEL SYSTEM

(71) Applicant: Sunrun South LLC, San Luis Obispo, CA (US)

(72) Inventor: Greg McPheeters, Santa Cruz, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 130 days.

(21) Appl. No.: 18/440,026

(22) Filed: Feb. 13, 2024

(65) Prior Publication Data

US 2024/0413782 A1     Dec. 12, 2024

Related U.S. Application Data

(60) Continuation of application No. 17/964,629, filed on Oct. 12, 2022, now Pat. No. 11,936,333, which is a (Continued)

(51) Int. Cl.
| | |
|---|---|
| *H02S 20/30* | (2014.01) |
| *F24S 25/30* | (2018.01) |
| *F24S 25/61* | (2018.01) |
| *F24S 25/634* | (2018.01) |
| *F24S 25/70* | (2018.01) |

(Continued)

(52) U.S. Cl.
CPC .............. *H02S 20/30* (2014.12); *F24S 25/30* (2018.05); *F24S 25/61* (2018.05); *F24S 25/634* (2018.05); *F24S 25/70* (2018.05);

*H02S 20/23* (2014.12); *F24S 2025/016* (2018.05); *F24S 2025/019* (2018.05)

(58) Field of Classification Search
CPC .......... H02S 20/30; H02S 20/23; F24S 25/70; F24S 25/634; F24S 25/30; F24S 25/61; F24S 2025/019; F24S 2025/016
See application file for complete search history.

(56) References Cited

U.S. PATENT DOCUMENTS

| | | | | | |
|---|---|---|---|---|---|
| 4,212,291 | A | * | 7/1980 | Erb ......................... | F24S 25/60 |
| | | | | | 126/669 |
| 5,820,092 | A | * | 10/1998 | Thaler .................... | F24F 13/32 |
| | | | | | 248/676 |

(Continued)

*Primary Examiner* — Nkeisha Smith
(74) *Attorney, Agent, or Firm* — Herbert Smith Freehills Kramer (US) LLP

(57) ABSTRACT

Surface mount assemblies for mounting to a solar panel frame to an installation surface are disclosed. In some embodiments, a base is coupled to a height-adjustable rail mount to slidably couple a track with a fastener assembly that includes of a fastener, spacer, and nut. In some embodiments, a base is coupled to a rail mount and positioned on a base plate to slidably couple to a surface track with a fastener assembly that includes a first fastener slidably coupled to a groove formed by the track, spacer, and second fastener. In some embodiments, a base is coupled to a rail mount for slidably coupling the rail to a height-adjustable base with a fastener. In some embodiments, a two-configuration, track-mounted, rectangular base is designed with a rectangular base having a pair of short-sided legs, a pair of long-sided legs, and a fastener for engaging outer surfaces of a track.

11 Claims, 16 Drawing Sheets

Related U.S. Application Data continuation of application No. 17/336,170, filed on Jun. 1, 2021, now Pat. No. 11,569,779, which is a division of application No. 16/113,516, filed on Aug. 27, 2018, now Pat. No. 11,114,974.

(60) Provisional application No. 62/550,120, filed on Aug. 25, 2017.

(51) Int. Cl.
 *H02S 20/23* (2014.01)
 *F24S 25/00* (2018.01)

(56) References Cited

U.S. PATENT DOCUMENTS

| | | | | |
|---|---|---|---|---|
| 7,188,452 | B2 * | 3/2007 | Sridhara | E04H 9/0237 |
| | | | | 188/266 |
| 8,136,311 | B2 * | 3/2012 | Liu | F24S 25/61 |
| | | | | 52/173.3 |
| 8,661,765 | B2 * | 3/2014 | Schaefer | F24S 25/65 |
| | | | | 52/239 |
| 8,752,338 | B2 * | 6/2014 | Schaefer | H01R 4/64 |
| | | | | 52/173.3 |
| 9,010,041 | B2 * | 4/2015 | Danning | F16B 5/0233 |
| | | | | 52/173.3 |
| 9,134,044 | B2 * | 9/2015 | Stearns | E04D 13/14 |
| 9,145,685 | B2 * | 9/2015 | Stapleton | E04D 3/365 |
| 9,825,581 | B2 * | 11/2017 | Wildes | F24S 25/61 |
| 9,941,835 | B2 * | 4/2018 | Molina | F24S 25/61 |
| 10,036,576 | B1 * | 7/2018 | Robinson | F24S 25/632 |
| 10,992,250 | B2 * | 4/2021 | Ayers | H02S 30/10 |
| 11,251,743 | B2 * | 2/2022 | Schuit | H02S 20/23 |
| 11,326,736 | B2 * | 5/2022 | Graboski | H02S 20/23 |
| 2011/0120047 | A1 * | 5/2011 | Stearns | E04B 1/66 |
| | | | | 52/698 |
| 2014/0110543 | A1 * | 4/2014 | Aliabadi | H02S 20/20 |
| | | | | 248/201 |
| 2014/0179133 | A1 * | 6/2014 | Redel | F24S 25/37 |
| | | | | 439/121 |
| 2014/0366465 | A1 * | 12/2014 | Bragagna | H10F 19/00 |
| | | | | 52/173.3 |
| 2015/0129517 | A1 * | 5/2015 | Wildes | F24S 25/632 |
| | | | | 211/41.1 |
| 2015/0146314 | A1 * | 5/2015 | Niemeyer | F24S 25/12 |
| | | | | 359/853 |
| 2015/0280638 | A1 * | 10/2015 | Stephan | H02S 20/00 |
| | | | | 52/173.3 |
| 2015/0288320 | A1 * | 10/2015 | Stearns | F24S 25/60 |
| | | | | 52/173.3 |
| 2016/0268958 | A1 * | 9/2016 | Wildes | H02S 20/23 |
| 2016/0268959 | A1 * | 9/2016 | Meine | F24S 25/61 |
| 2017/0264235 | A1 * | 9/2017 | Molina | H02S 20/23 |
| 2018/0209693 | A1 * | 7/2018 | Parkinson | F24S 25/11 |
| 2019/0068110 | A1 * | 2/2019 | McPheeters | F24S 25/70 |
| 2019/0323733 | A1 * | 10/2019 | Lv | H02S 20/20 |
| 2025/0038699 | A1 * | 1/2025 | Tomolillo | H02S 20/23 |

* cited by examiner

127

127

127b

127d

127a

127c

Detail A

Detail B

SIDE VIEW

TOP VIEW

BOTTOM VIEW

SURFACE MOUNT ASSEMBLIES FOR A SOLAR PANEL SYSTEM

CROSS-REFERENCE TO RELATED APPLICATIONS

This application is a continuation of U.S. patent application Ser. No. 17/964,629, filed Oct. 12, 2022 which is a continuation of U.S. patent application Ser. No. 17/336,170 filed Jun. 1, 2021, which issued on Jan. 31, 2023, as U.S. Pat. No. 11,569,779, which is a divisional of U.S. patent application Ser. No. 16/113,516, filed Aug. 27, 2018, which issued on Sep. 7, 2021, as U.S. Pat. No. 11,114,974, which claims the benefit of U.S. Provisional Application No. 62/550,120 filed on Aug. 25, 2017, entitled "Height-Adjustable Surface Mount Assemblies for a Solar Panel System." which is incorporated by reference herein in its entirety.

TECHNICAL FIELD

The present invention relates to solar panel systems, and in particular, to mounting assemblies installed to installation surface of a solar panel system.

BACKGROUND

Solar modules may be mounted to an installation surface, such as a roof, using surface mount assemblies. Due to imperfect installation conditions, such as uneven installation surfaces and physical differences between the various solar modules that make up an array, surface mount assemblies may be need to be height adjustable in order to achieve a level installation. Accordingly, it would be desirable to employ surface mount assemblies with adjustable heights.

SUMMARY

Embodiments of the inventive concepts disclosed herein are directed to height-adjustable surface mount assemblies to which a solar module frame of a solar module or an array of solar modules may be suspended above the installation surface.

In one aspect, embodiments of the inventive concepts disclosed herein are directed to a surface mount assembly for mounting to a solar panel frame to an installation surface. The assembly could include a base, a track, a plate with a raised portion that includes an aperture(s) extending away from a surface of the raised portion.

In a further aspect, embodiments of the inventive concepts disclosed herein are directed to a fastener assembly for mounting to a solar panel frame to an installation surface. The fastener assembly could include a first fastener, a second fastener, and a spacer, where threads of the first fastener engage a threaded aperture of a first end of the spacer and threads of the second fastener engage a threaded aperture of a second end.

In a further aspect, embodiments of the inventive concepts disclosed herein are directed to a threaded cap for mounting to a solar panel frame to an installation surface. The threaded cap could include an outer shell, and an inner concentric, threaded cylindrical member.

In a further aspect, embodiments of the inventive concepts disclosed herein are directed to a track for mounting to a solar panel frame to an installation surface. The track could include a left side, a right side, an inner surface, and an outer surface which includes a first vertical wall, a second vertical wall, a horizontal wall, a first aperture, and a horizontal flange.

In a further aspect, embodiments of the inventive concepts disclosed herein are directed to a structural component for mounting to a solar panel frame to an installation surface. The component could include a left side, a right side, an inner surface, and an outer surface which includes a first flange, a second flange, a third flange, a first aperture, and a second aperture.

In a further aspect, embodiments of the inventive concepts disclosed herein are directed to a structural mount assembly for mounting to a solar panel frame to an installation surface. The assembly could include a hollow rectangular component, a first diagonal member, and a second diagonal member.

BRIEF DESCRIPTION OF THE DRAWINGS

For a fuller understanding of the inventive embodiments, reference is made to the following description taken in connection with the accompanying drawings in which.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details or in combination with other components. In other instances, well-known implementations or operations are not shown or described in detail to avoid obscuring aspects of various embodiments of the inventive concepts disclosed herein.

The surface mount assemblies disclosed herein may be employed to adjust the height of an array of solar modules suspended above an installation surface. The height-adjustable surface mount assemblies may be coupled to the installation surface and used to support the solar modules at desired levels above the installation surface.

Figures 1A, 1B:
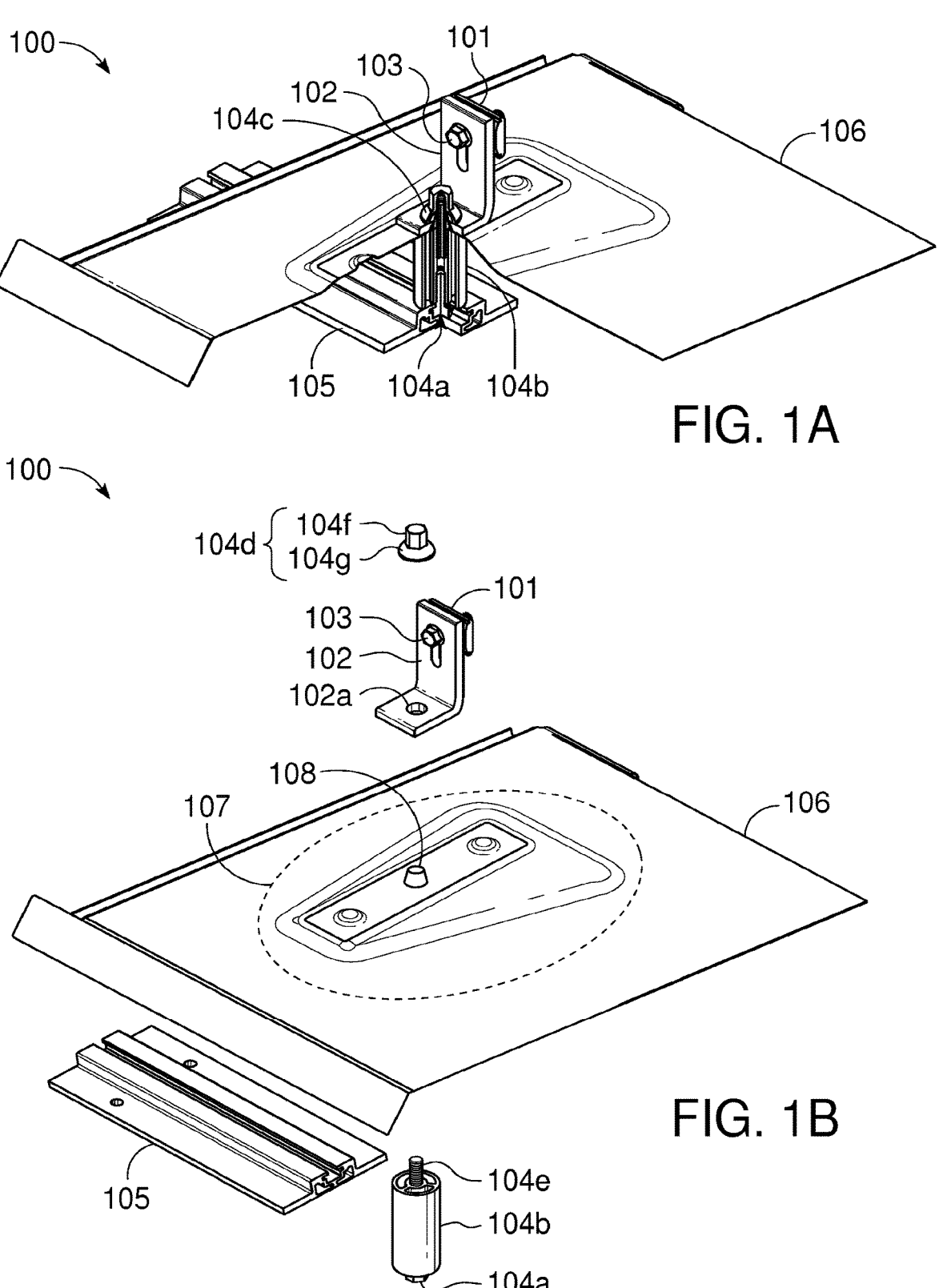
FIG. 1A illustrates a perspective cutaway view of a first surface mount assembly including attaching hardware, in accordance with some embodiments.
FIG. 1B illustrates an exploded view of the first surface mount assembly including attaching hardware, in accordance with some embodiments.

FIGS. 1A and 1B illustrate perspective and exploded views, respectively, of first surface mount assembly 100. Height-adjustable mount 101 is slidably coupled to base 102 with fastener 103 extending through an elongated aperture as shown. Fastener assembly comprised of track fastener 104a, spacer 104b, and base fastener 104c slidably engages track 105 that may be attached to an installation surface (not shown). In some embodiments, base fastener 104c is comprised of cap 104d and threaded insert 104e. Base plate 106 includes raised portion 107 having an aperture 108 rising above or protruding from base plate 106. Except for raised portion 107, the shape of base plate 106 is flat.

The fastener assembly couples base 102 to track 105. A threaded end of track fastener 104a extends through a groove of track 105 to threadably engage complementary threads of a lower portion of spacer 104b, and a threaded end of base fastener 104c extends though apertures 107 and aperture 102a of base 102 to threadably engage complementary threads of an upper portion of spacer 104b. In some embodiments where base fastener 104c is comprised of cap 104d and threaded insert 104e, a lower portion of a threaded insert 104e that threadably engages complementary threads of an upper portion of spacer 104b while an upper portion of threaded insert 104e extends through apertures 107 and 102a to threadably engage complementary threads of an upper portion 104f of cap 104d. In some embodiments, lower portion 104g of cap 104d is conically flared to cover aperture 102a when aperture 102a is positioned over or against aperture 108 as cap 104d is secured against base 102.

Figure 1C:
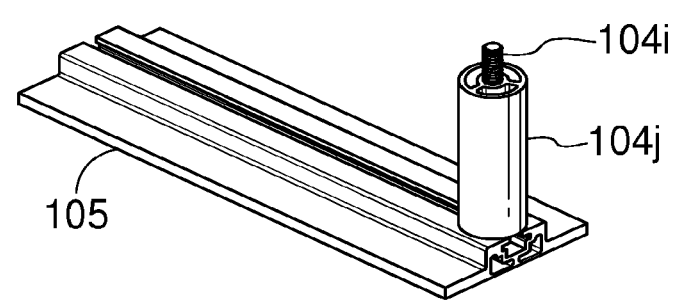
FIG. 1C illustrates a perspective view of a track and alternative attaching hardware of the first surface mount assembly, in accordance with some embodiments.
Figure 1D:
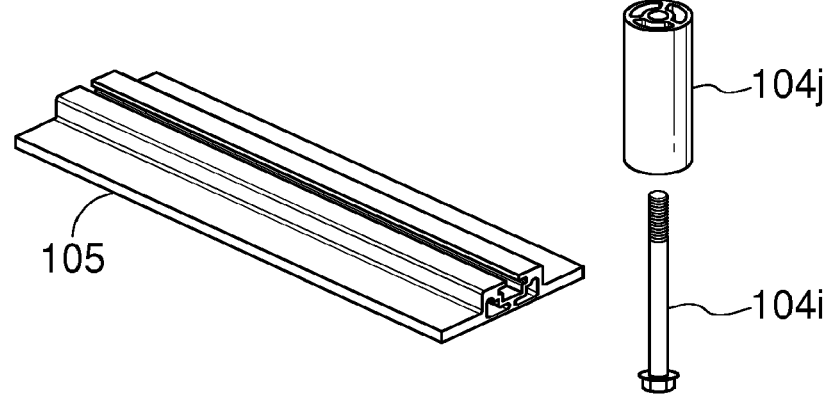
FIG. 1D illustrates an exploded view of the track and alternative attaching hardware of the first surface mount assembly, in accordance with some embodiments.
Figure 1E:
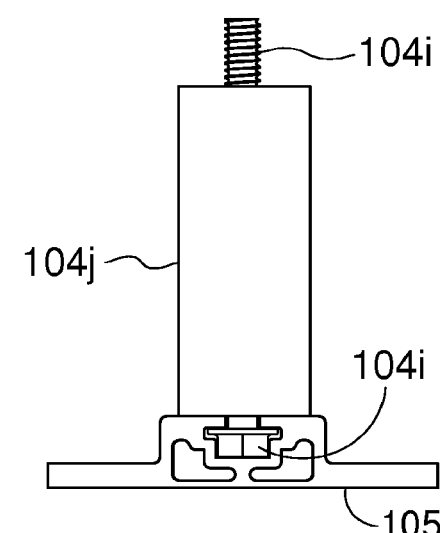
FIG. 1E illustrates a side view of the track and first alternative hardware of the first surface mount assembly, in accordance with some embodiments.

FIG. 1C through 1E illustrate two perspective views and one side view, respectively, of components of an alternative fastener assembly for slidably engaging track 105. As shown, track fastener 104i could be a bolt extending through a spacer 104j for slidably engaging track 105.

Figure 2A:
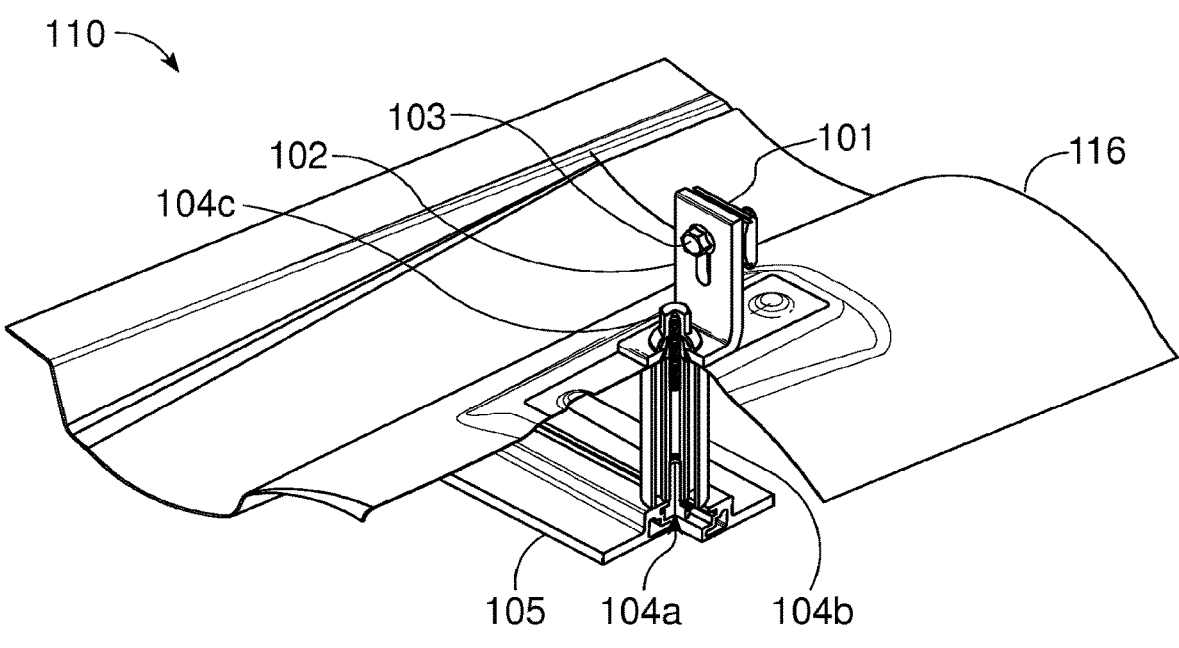
FIG. 2A illustrates a perspective cutaway view of a second surface mount assembly, in accordance with some embodiments.
Figure 2B:
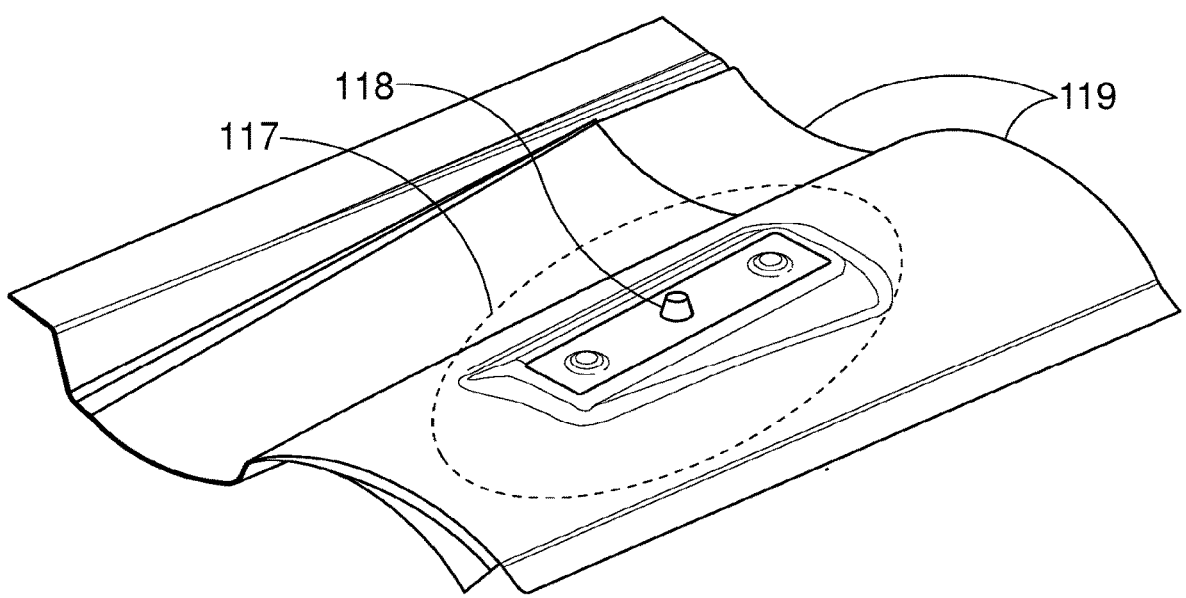
FIG. 2B illustrates a perspective view of a base plate of the second surface mount assembly.

FIGS. 2A and 2B illustrate perspective views of second surface mount assembly 110. With the exception of base plate 106, the components shown in FIGS. 1A and 1B are the same for second surface mount assembly 110. As shown, base plate 116 includes raised portion 117 having an aperture 118 rising above or protruding from base plate 116. Except for raised portion 117, the shape of base plate 116 has a curved shape which could be employed to fit on a surface having a matching or complementary contour.

Figure 3A:
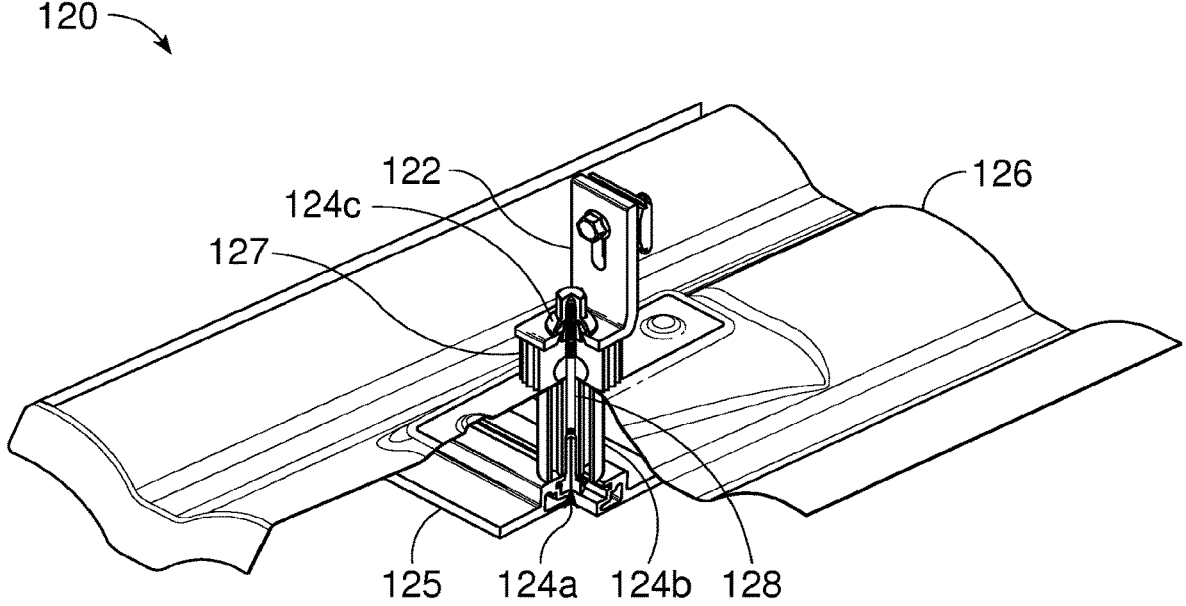
FIG. 3A illustrates a perspective view of a third surface mount assembly coupled to a rail, in accordance with some embodiments.
Figure 3B:
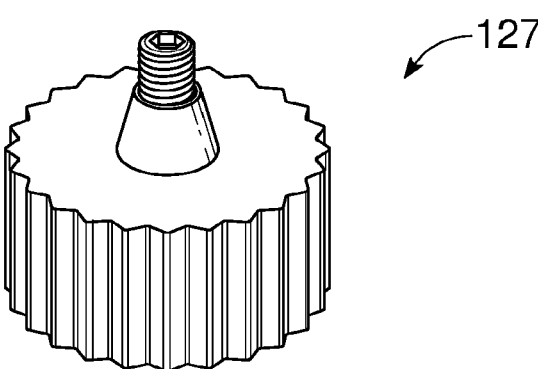
FIG. 3B illustrates a perspective view of a spacer of the third surface mount assembly, in accordance with some embodiments.
Figure 3C:
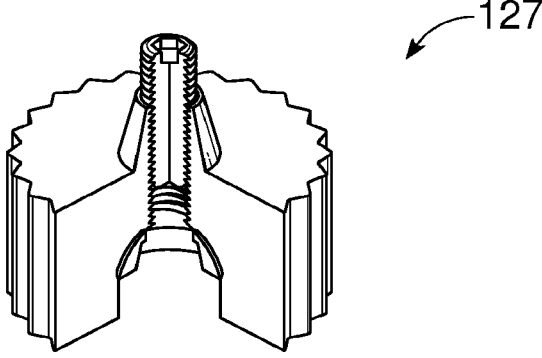
FIG. 3C illustrates a cutaway perspective view of the spacer of the third surface mount assembly, in accordance with some embodiments.
Figure 3D:
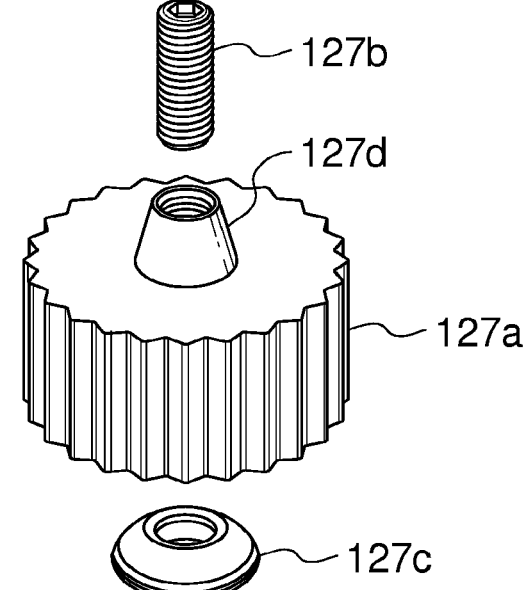
FIG. 3D illustrates an exploded view of the spacer of the third surface mount assembly, in accordance with some embodiments.

FIG. 3A illustrates a perspective view of third surface mount assembly 120, and FIGS. 3B through 3D illustrate perspective, cutaway perspective, and exploded view, respectively, of spacer 127. Referring to FIGS. 3A through 3D, fastener assembly comprised of track fastener 124a, spacer 124b, base fastener 124 (comprised of a cap and a threaded insert), spacer assembly 127, and threaded insert 128 slidably engages track 125 that may be attached to an installation surface (not shown). Similar to those discussed above, base plate 126 includes raised portion (similar to raised portion 107) having an aperture (similar to aperture 108) rising above or protruding from base plate 126. Spacer assembly 127 includes spacer 127a, threaded insert 127b, washer 127c, and aperture 127d rising above an upper surface of washer 127c.

The fastener assembly couples base 122 to track 125. A threaded end of track fastener 124a threadably engages complementary threads of a lower portion of spacer 124b after extending through a groove of track 125; threaded insert 128 threadably engages complementary threads of both an upper portion of spacer 124b and a lower portion of spacer 127a after extending though aperture (similar to aperture 108) of the raised portion; and a threaded end of base fastener 124c threadably engages complementary threads of aperture 127d as it extends through both the aperture of base 122 (similar to aperture 102a). In some embodiments, it is a lower portion of threaded insert 127b that threadably engages complementary threads of aperture 127d while an upper portion of threaded insert 127b threadably engages complementary threads of an upper portion of the cap of base fastener 124c after extending through the aperture the aperture of base 122. In some embodiments, a lower portion of such cap is conically flared to cover the horizontal leg aperture when such aperture is positioned over or against the aperture 127d as the cap of base fastener 124c is secured against base 122.

Figure 4A:
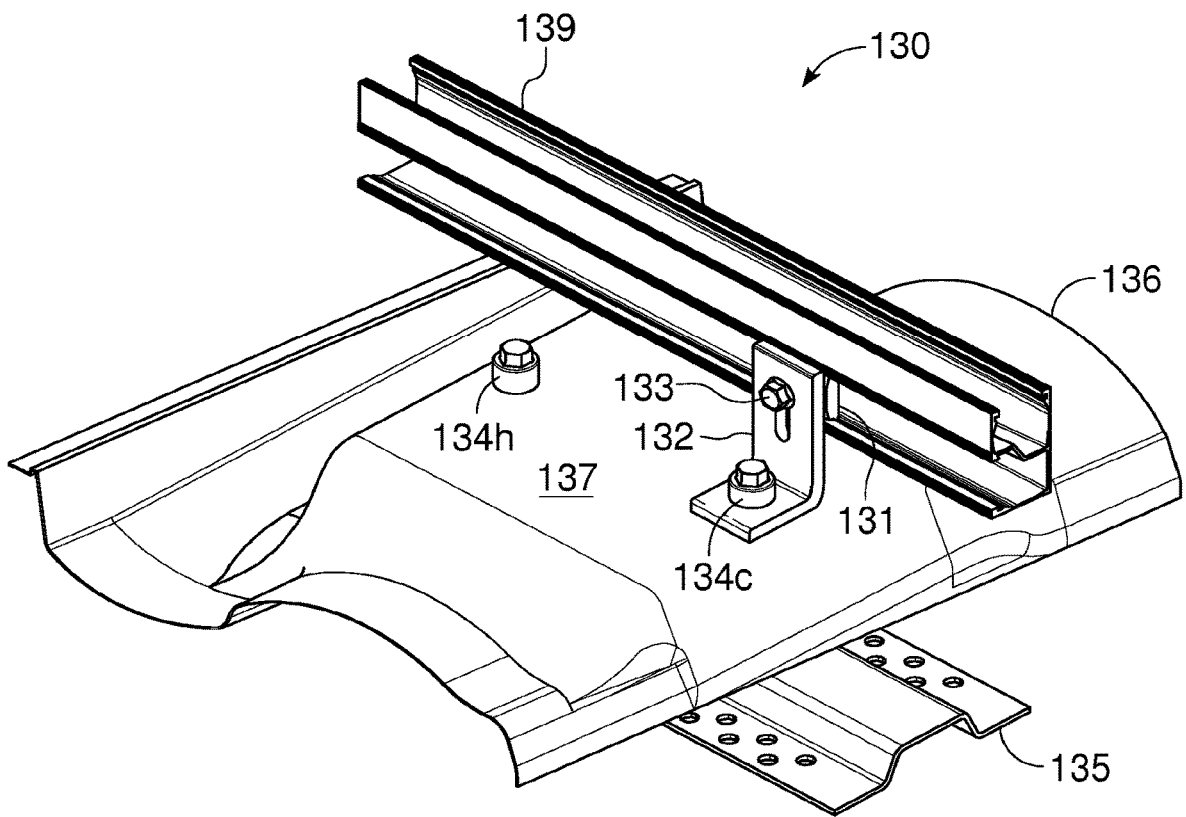
FIG. 4A illustrates a perspective view of a fourth surface mount assembly, in accordance with some embodiments.
Figure 4B:
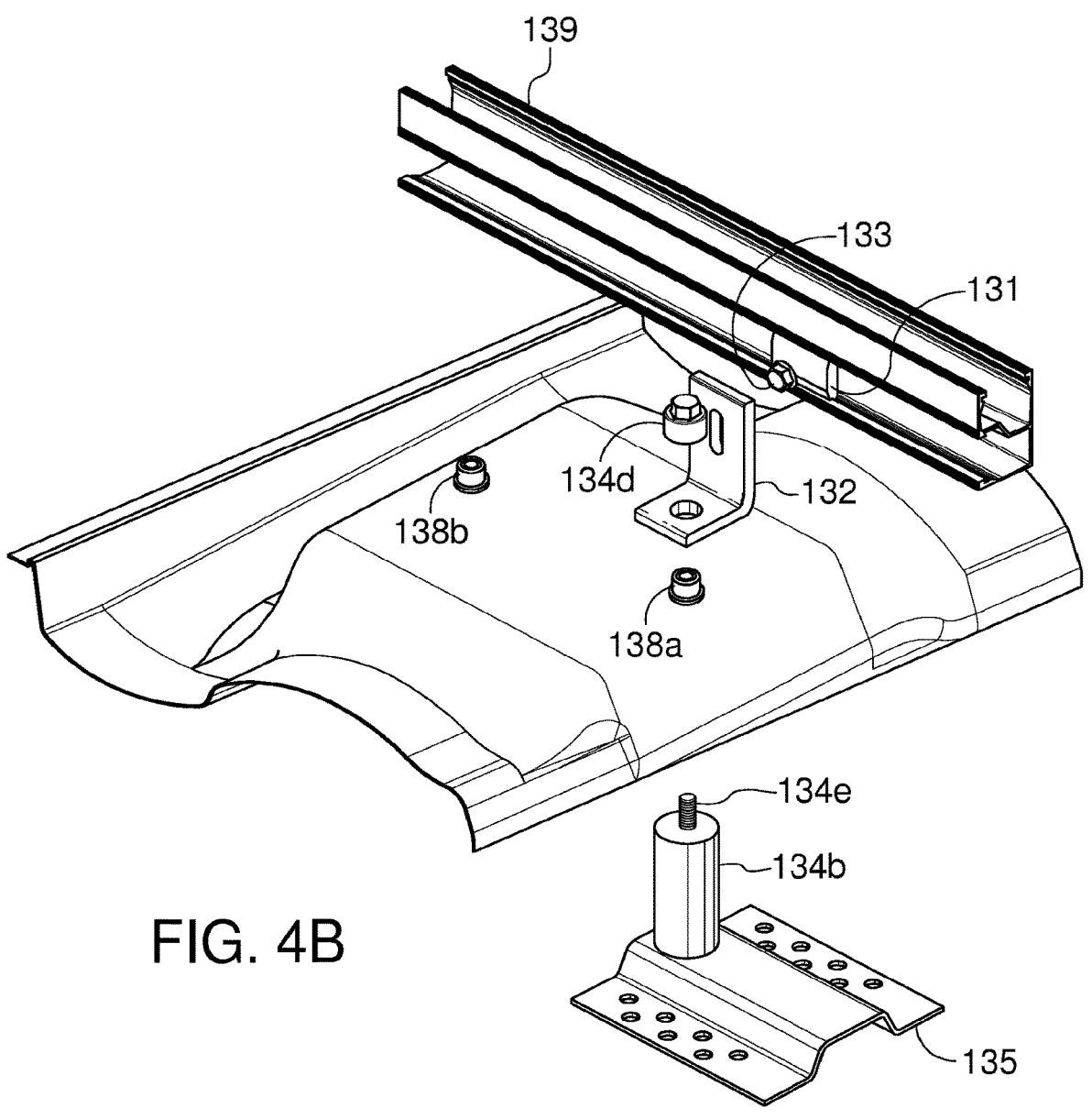
FIG. 4B illustrates an exploded view of the fourth surface mount assembly, in accordance with some embodiments.
Figure 4C:
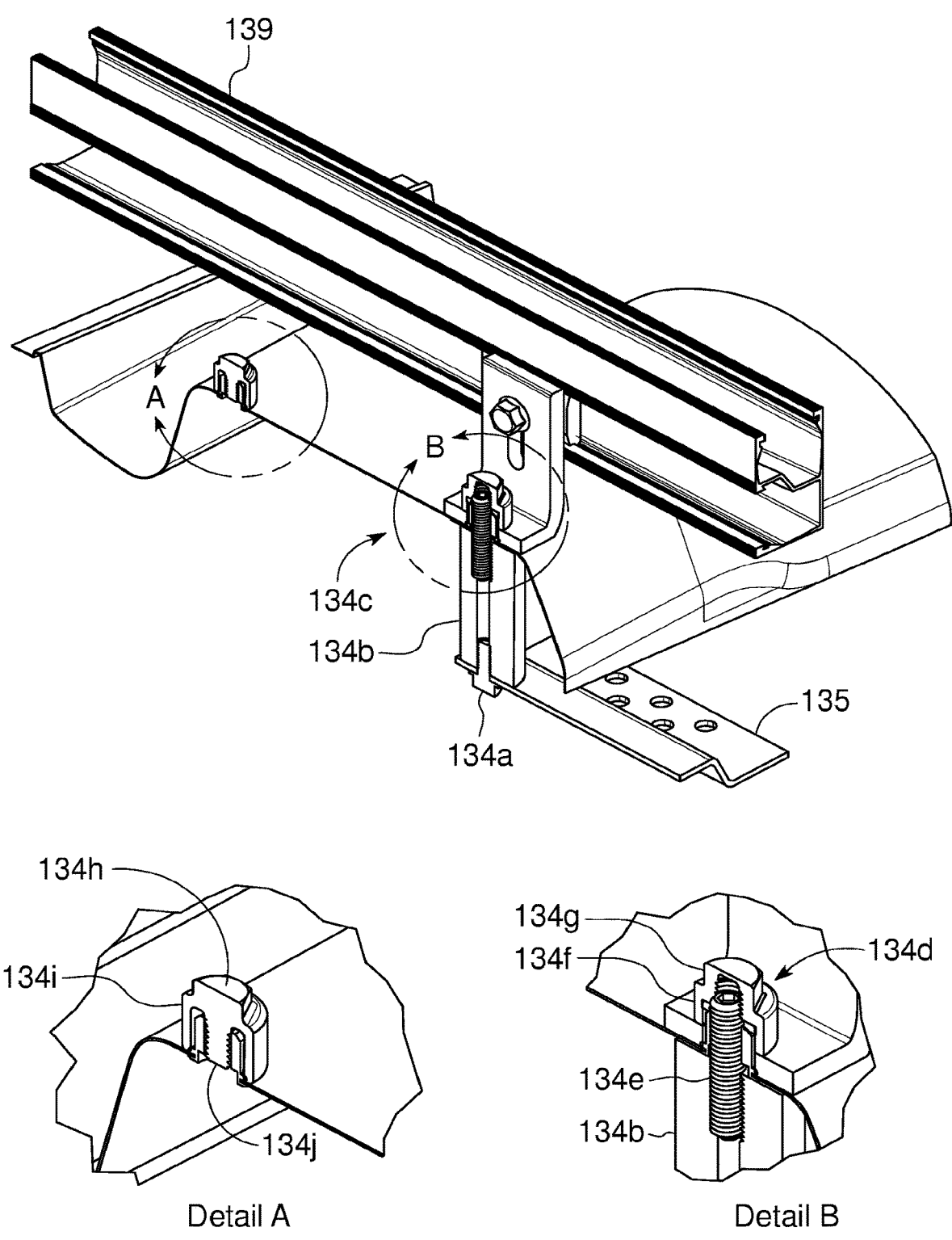
FIG. 4C illustrates a perspective cutaway view of the fourth surface mount assembly, in accordance with some embodiments.

FIGS. 4A through 4C illustrate perspective, exploded, and perspective cutaway views, respectively, of fourth surface mount assembly 130. Height-adjustable mount 131 is slidably coupled to base 132 with fastener 133 extending through an elongated aperture for slidably coupling rail or track 139 to base 132. Fastener assembly comprised of track fastener 134a, spacer 134b, and base fastener 134c slidably engages track 135 that may be attached to an installation surface (not shown). In some embodiments, base fastener 134c is comprised of cap 134d and threaded insert 134e. Base plate 136 includes raised portion 137 rising above or protruding from base plate 136. In some embodiments, the edges of raised portion 137 are configured to fit a contour of a curved shape of base plate 136 employed to fit on a surface having a matching or complementary contour. In some embodiments, raised portion 137 includes apertures 138*a* and 138*b*.

The fastener assembly couples base 132 to track 135. In some embodiments, cap 134*d* includes lower tier 134*f* and upper tier 134*g* for placement of cap 134*d* over aperture 138*a*. In some embodiments, an inner surface of upper tier 134*g* is threaded for engaging complementary threads of threaded insert 134*e* extending through aperture 138*a*. In some embodiments, an inner surface of aperture 138*a* is threaded for engaging complementary threads of threaded insert 134*e* extending through aperture 138*a*. In some embodiments, an inner surface of lower tier 134*f* is positioned over an outer surface of aperture 138*a* as cap 134*d* is secured against base 132.

In some embodiments, raised portion 137 includes second aperture 138*b* over which cap 134*h* is placed. In some embodiments, cap 134*h* could include cylindrical outer shell 134*i* and concentric, threaded cylindrical member 134*j* extending inside of and substantially parallel to cylindrical outer shell 134*i* to form a cylindrical groove for the placement of cap 134*h* over aperture 138*b*. In some embodiments, an inner surface of aperture 138*b* is threaded for engaging complementary threads of threaded cylindrical member 134*j*. In some embodiments, an inner surface of cylindrical outer shell 134*i* is positioned against an outer surface of aperture 138*b* when cap 134*h* is placed over aperture 138*b*.

Figure 4D:
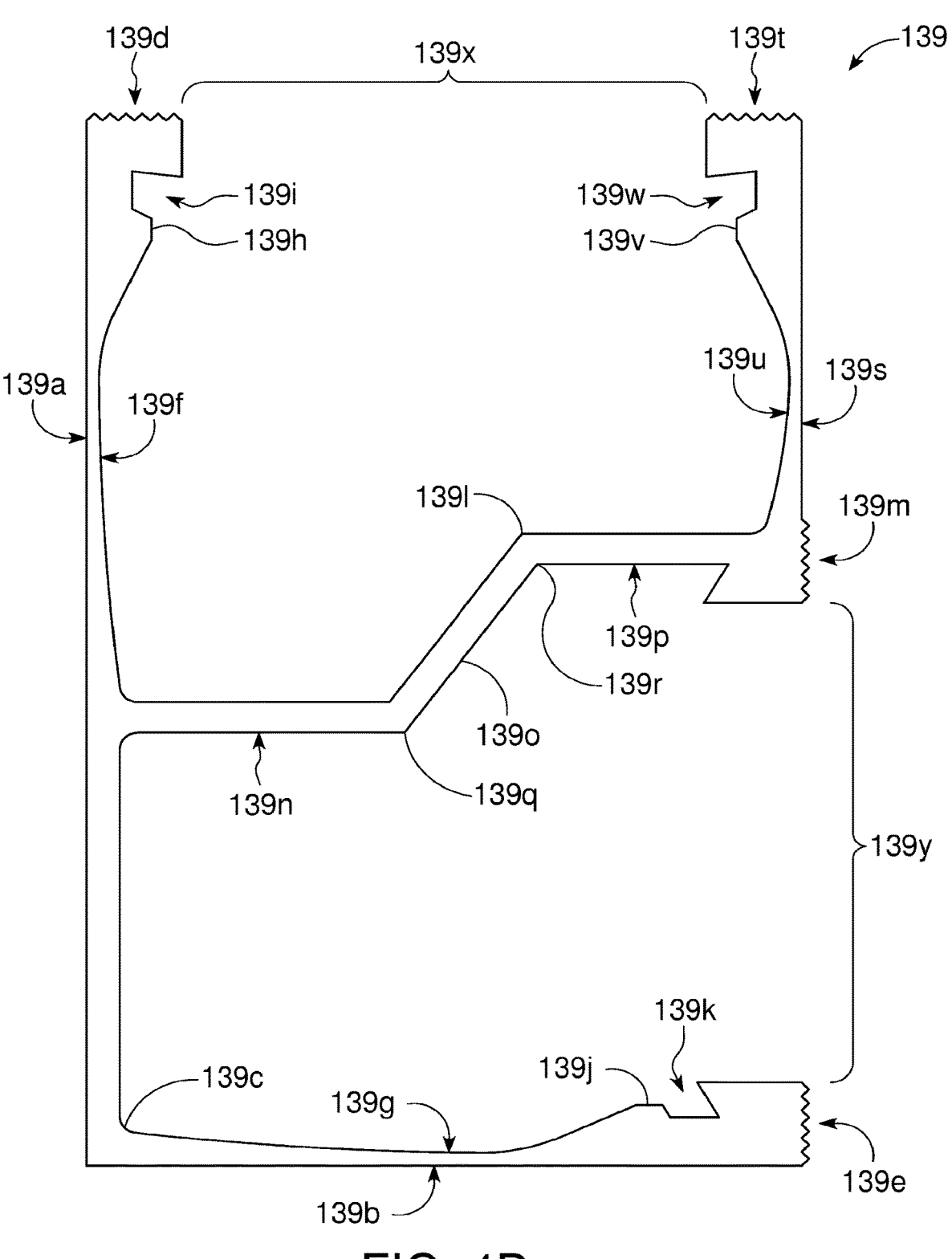
FIG. 4D illustrates a side view of a track of the fourth surface mount assembly, in accordance with some embodiments.

FIG. 4D illustrates a side view of track 139 which includes vertical wall 139*a* and horizontal wall 139*b* intersecting with one another to form corner 139*c*. Vertical wall 139*a* extends from corner 139*c* until reaching flange 139*d*, and horizontal wall 139*b* extends substantially perpendicularly away from vertical wall 139*a* until reaching flange 139*e*. Flange 139*d* extends substantially perpendicularly away from vertical wall 139*a* and in the same direction as horizontal wall 139*b*, and flange 139*e* extends substantially perpendicularly away from horizontal wall 139*b* and in the same direction as vertical wall 139*a*.

In some embodiments, inner surfaces 139*f* and 139*g* of vertical wall 139*a* and horizontal wall 139*b*, respectively, are not straight. A portion 139*h* of an inner surface 139*f* approximately adjacent to flange 139*d* protrudes away from vertical wall 139*a* that, together with flange 139*d*, form a lengthwise groove 139*i*; similarly, a portion 139*j* of an inner surface 139*g* approximately adjacent to flange 139*e* protrudes away from horizontal wall 139*b* that, together with flange 139*e*, form a lengthwise groove 139*k*.

From a location between corner 139*c* and flange 139*d*, horizontal flange 139l extends substantially perpendicularly away from vertical wall 139*a* and in the same direction as horizontal member 139*b* until flange 139*m* is reached at its distal end. Flange 139*m* extends substantially perpendicularly away from horizontal flange 139l and in a direction towards horizontal wall 139*b*. In some embodiments, flanges 139*e* and 139*m* are paired flanges. In some embodiments, outer surfaces of paired flanges 139*e* and 139*m* are collinear with one another. In some embodiments, outer surfaces of paired flanges 139*e* and 139*m* are textured to provide mating surfaces to facilitate an engagement with a separate structural component having complementary mating surfaces with matching or complementary textures.

In some embodiments, horizontal member 139l includes first portion 139*n*, second portion 139o, and third portion 139*p* that is substantially parallel to first portion 139*n*. First portion 139*n* extends substantially perpendicularly away from vertical wall 139*a* until reaching one end 139*q* of second portion 139o, at which point second portion 139o extends upwardly away from first portion 139*n* until reaching an opposing end 139*r* of second portion 139o, at which point of third portion 139*p* extends away from second portion 139o until reaching flange 139*m*. In some embodiments, flange 139*m* forms one end of vertical wall 139*s*.

Vertical wall 139*s* extends substantially perpendicularly away from horizontal flange 139l and until flange 139*t* is reached at its distal end. Flange 139*t* extends substantially perpendicularly away from vertical wall 139*s* in a direction towards vertical wall 139*a*. In some embodiments, flanges 139*d* and 139*t* are paired flanges. In some embodiments, outer surfaces of paired flanges 139*d* and 139*t* are collinear with one another. In some embodiments, outer surfaces of paired flanges 139*d* and 139*t* are textured to provide mating surfaces to facilitate an engagement with a separate structural component having complementary mating surfaces with matching or complementary textures.

In some embodiments, inner surface 139*u* of vertical wall 139*s* is not straight. A portion 139*v* of inner surface 139*u* approximately adjacent to flange 139*t* protrudes away from vertical wall 139*s* that, together with flange 139*t*, form a lengthwise groove 139*w*. In some embodiments, the distance of gap 139*x* formed by flanges 139*d* and 139*t* is equal to gap 139*y* formed by flanges 139*e* and 139*m*.

Figure 5A:
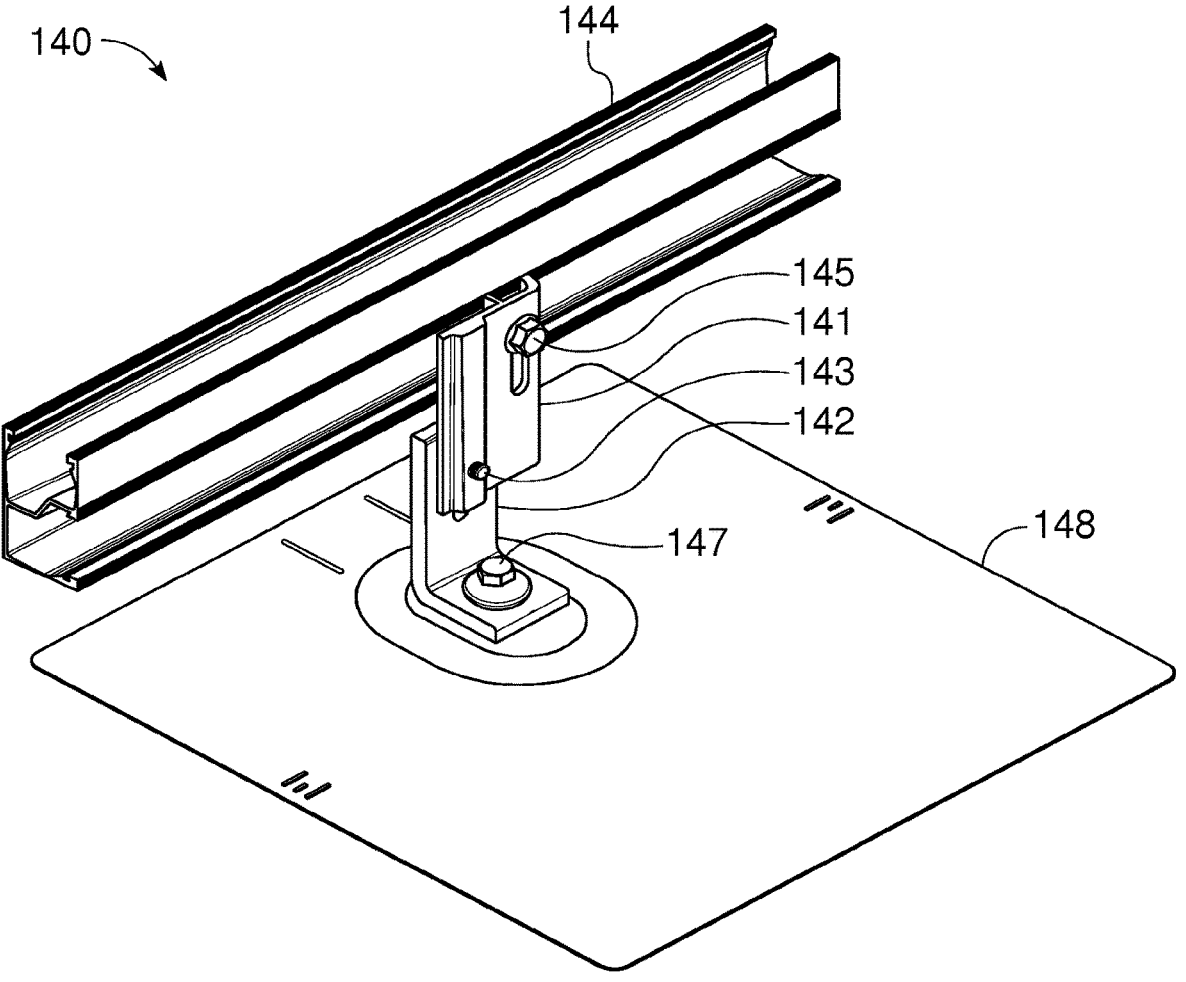
FIG. 5A illustrates a perspective view of a fifth surface mount assembly, in accordance with some embodiments.
Figure 5B:
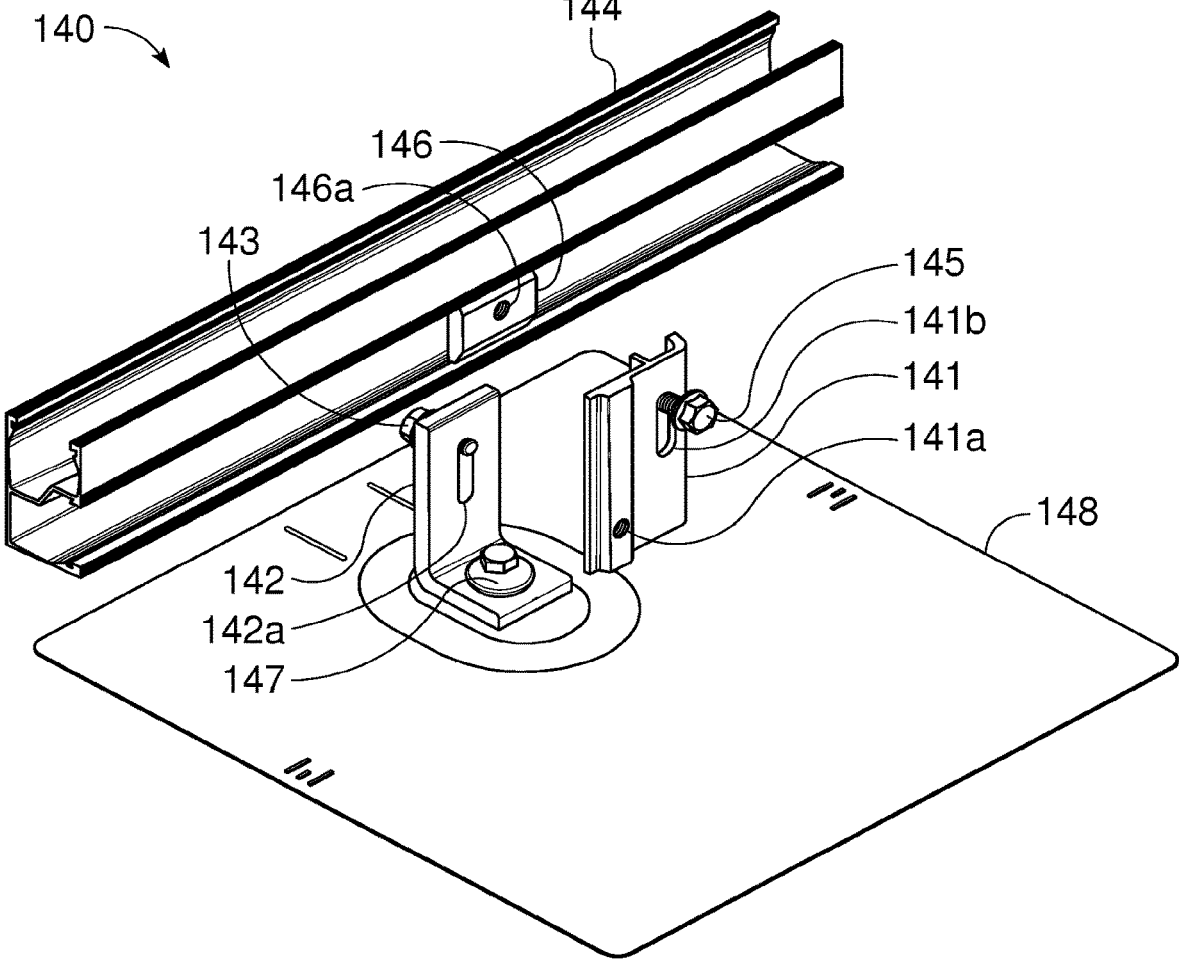
FIG. 5B illustrates an exploded view of the fifth surface mount assembly, in accordance with some embodiments.

FIGS. 5A and 5B illustrate perspective and exploded views of fifth surface mount assembly 140. Extender 141 is vertically slidably coupled to base 142 with fastener 143 extending through elongated aperture 142*a*, where fastener 143 is configured with threads to threadably engage complementary threads of aperture 141*a*. Track 144 (same as track 139 in FIGS. 4A through 4C) is vertically slidably coupled to extender 141 with fastener 145 and mount 146. Fastener 145 extends through elongated aperture 141*b* to threadably engage complementary threads of aperture 146*a*. Mount 146 is horizontally slidable within height-adjustable track 144. In some embodiments, base 142 may be attached to an underlying structure (not shown) with fastener 147 extending through an aperture of base plate 148.

Figure 5C:
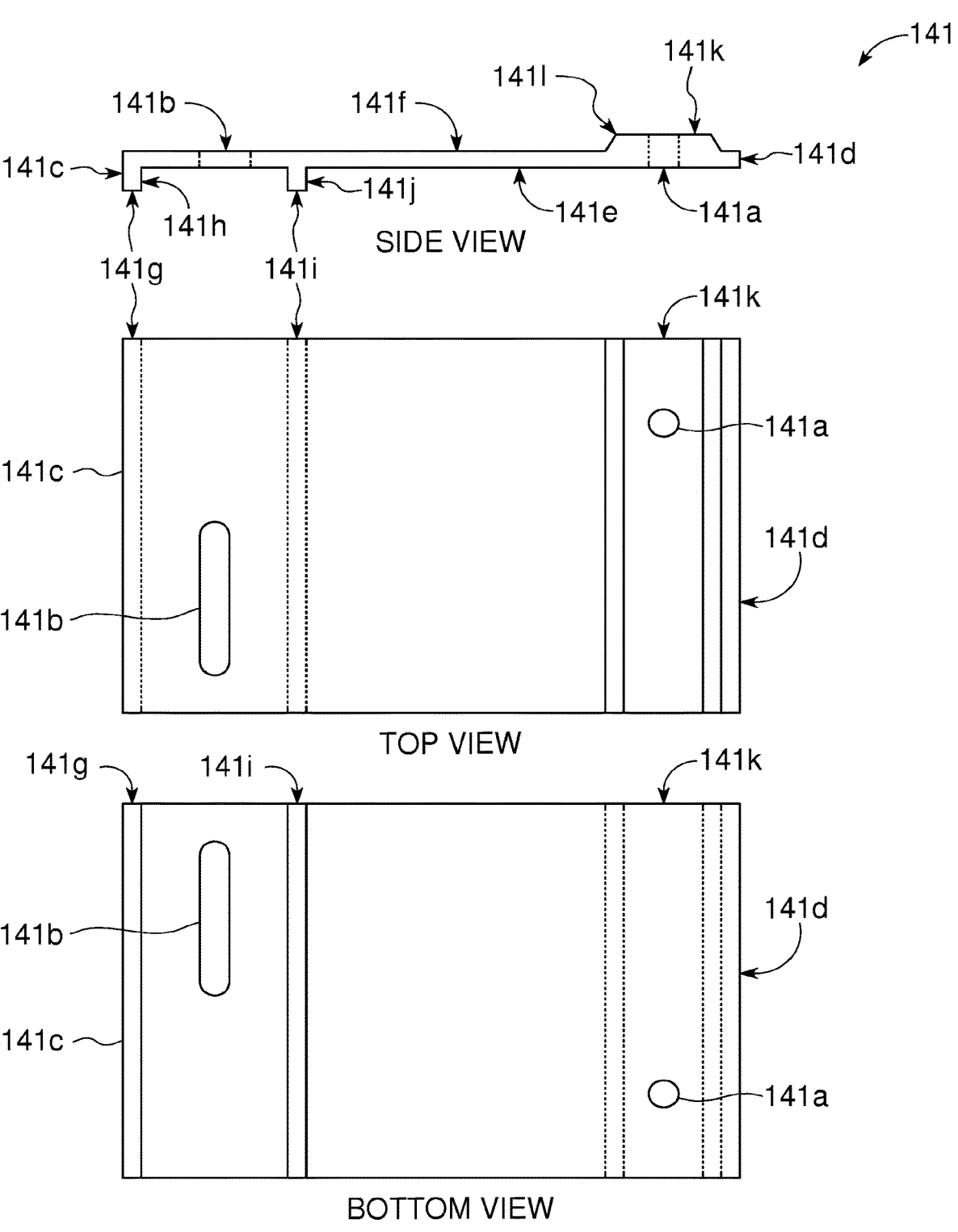
FIG. 5C illustrates side, top, and bottom views of an extender of the fifth surface mount assembly, in accordance with some embodiments.

FIG. 5C illustrates side, top, and bottom views of extender 141 comprised having left side 141*c*, right side 141*d*, inner surface 141*e*, and outer surface 141*f*. First inner flange 141*g* extends substantially perpendicularly away from inner surface 141*e* and lengthwise along left side 141*c* until reaching distal end 141*h*.

From a location between left side 141*c* and right side 141*d*, second inner flange 141*i* extends substantially perpendicularly away from inner surface 141*e* and lengthwise until reaching distal end 141*j*. In some embodiments, an imaginary line extending from distal end 141*h* to distal end 141*j* is substantially parallel to inner surface 141*e*. When employed in fifth surface mount assembly 140, first and second inner flanges 141*g* and 141*i* engage paired flanges of track 144 to transfer a force imparted by tightening of fastener 145 and to lock mount 146 into place.

Aperture 141*b* is located between first inner flange 141*g* and second inner flange 141*i*. In some embodiments, aperture 141*b* is elongated lengthwise. When employed in fifth surface mount assembly 140, fastener 145 extends through aperture 141*b* to engage mount 146.

From a location to the right of second inner flange 141*i*, outer flange 141*k* extends substantially perpendicularly away from outer surface 141*f* until reaching distal end 141l. In some embodiments, outer flange 141*k* is located to the left of right side 141*d*.

Aperture 141*a* is located within outer flange 141*k*. In some embodiments, aperture 141*a* is threaded for engaging complementary threads of fastener 143 extending through aperture 142*a*. When employed in fifth surface mount assembly 140, fastener 143 engages extender 141*a*; when a tightening force is applied, extender 141 is drawn towards the vertical leg of base 142 until inner surface 141*e* on the right side of flange 141*j* engages a surface of base 142 to transfer a force imparted by tightening of fastener 143.

Figure 6:
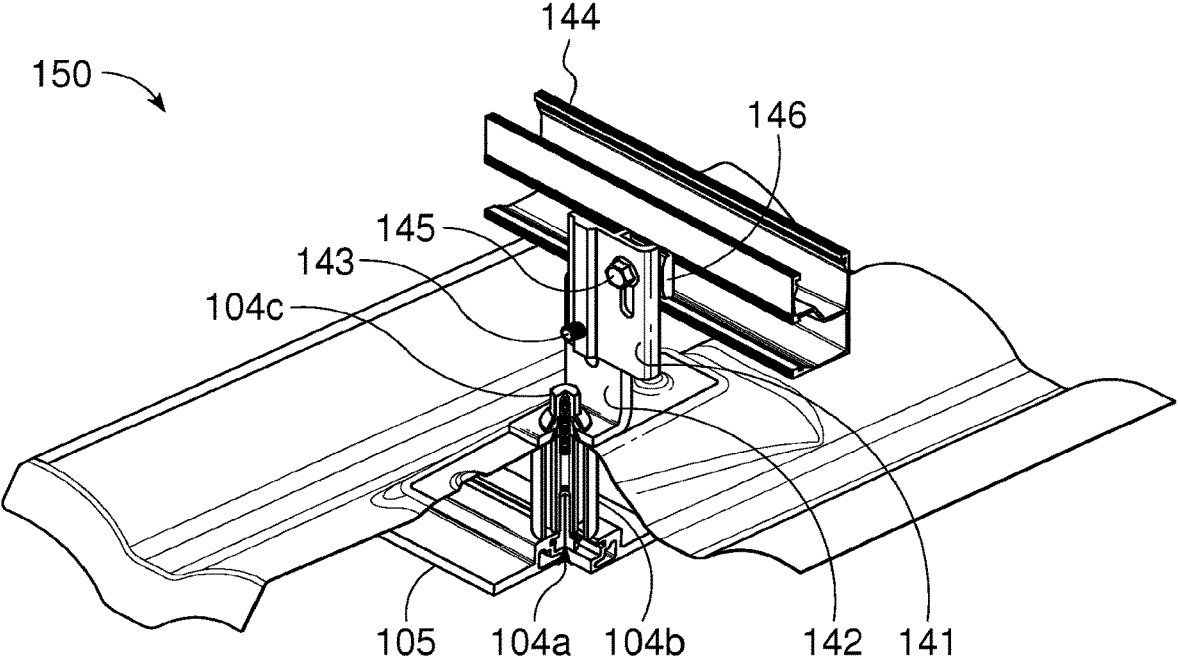
FIG. 6 illustrates a perspective view of a sixth surface mount assembly, in accordance with some embodiments.

FIG. 6 illustrates a perspective view of sixth surface mount assembly 150. As illustrated, sixth surface mount assembly 150 is comprised of components of fifth surface mount assembly 140 and components of first surface mount assembly 100 to mount fifth surface mount assembly 140 (comprised of height-adjustable extender 141, base 142, fastener 143, height-adjustable track 144, fastener 145, and mount 146) to track 105 with fastener assembly comprised of track fastener 104*a*, spacer 104*b*, and base fastener 104*c*.

Figure 7A:
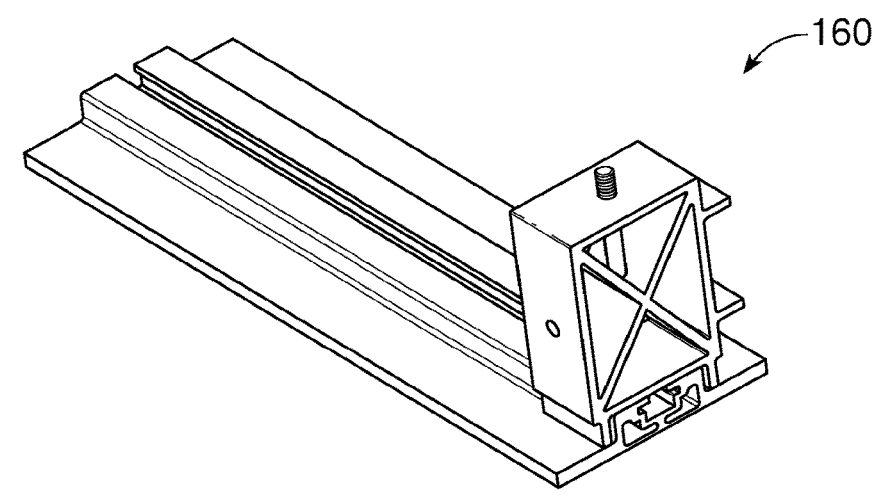
FIG. 7A illustrates a first perspective view of a track-mounted rectangular base, in accordance with some embodiments.
Figure 7B:
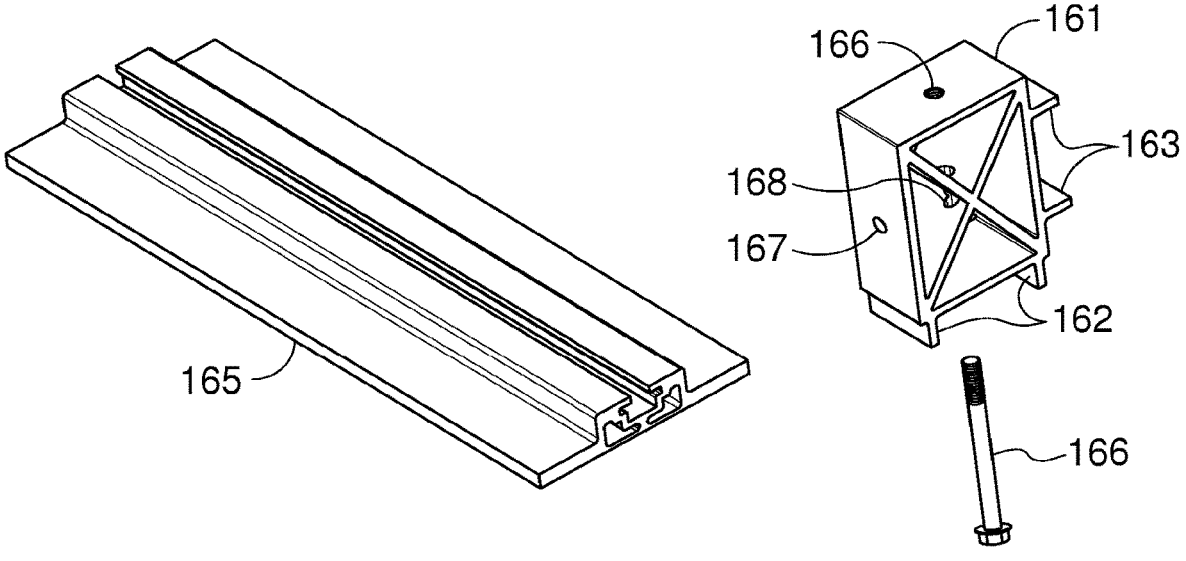
FIG. 7B illustrates a first exploded view of the track-mounted rectangular base, in accordance with some embodiments.

FIGS. 7A and 7B illustrate first perspective and first exploded views of track-mounted rectangular base 160 which include rectangular base 161 with a pair of short-sided legs 162 (corresponding to the shorter side of the rectangle), a pair of long-sided legs 163 (corresponding to the longer side of the rectangle), and fastener 164 for engaging outer surfaces of track 165. Each short side of rectangular base 161 includes aperture 166, and each long side includes aperture 167. Aperture 168 is formed at an intersection of a pair of diagonal braces 169, each brace connecting opposite inner corners of rectangular base 161.

Figure 7C:
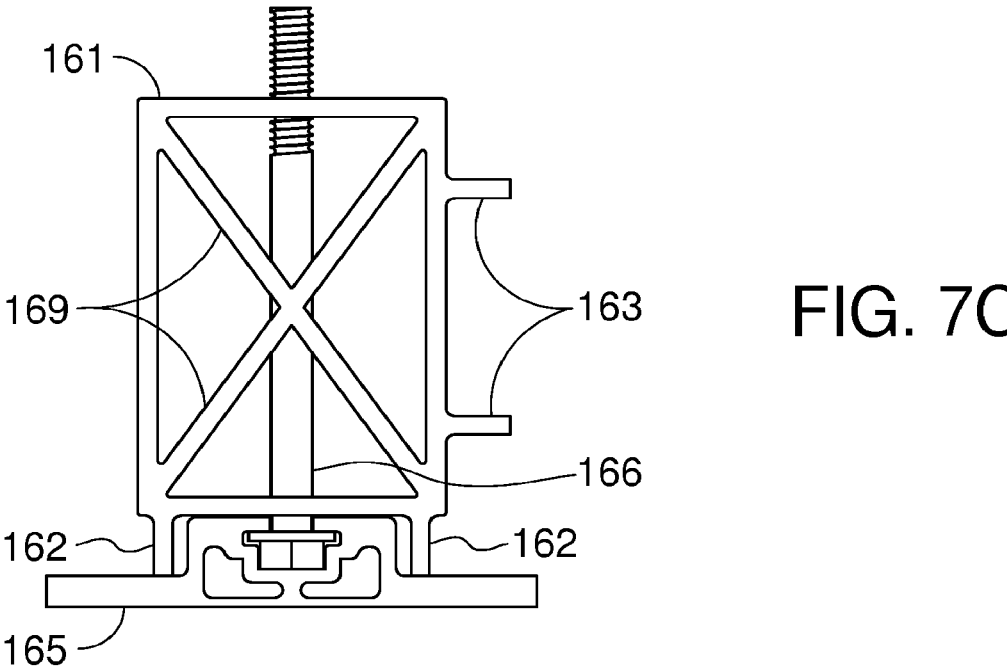
FIG. 7C illustrates a first side view of the track-mounted rectangular base, in accordance with some embodiments.

FIG. 7C illustrates a first side view of track-mounted rectangular base 160. As shown, base 161 engages track 165 with fastener 166 extending through apertures 166 of the short sides and aperture 168, where inner surfaces of the pair of short-sided legs 162 are placed adjacent to the outer surfaces of track 165 and/or the distal ends of short-sided legs 162 contact an upper surface of track 165.

Figure 7D:
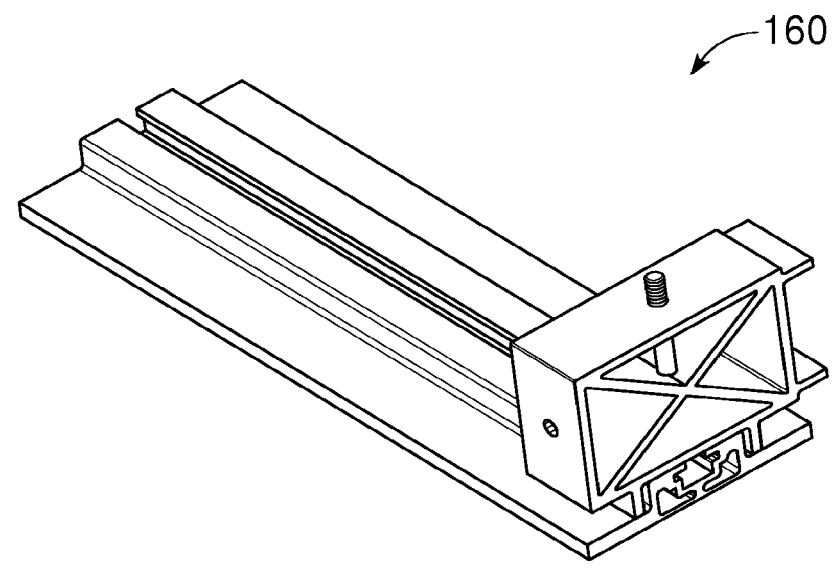
FIG. 7D illustrates a second perspective view of the track-mounted rectangular base, in accordance with some embodiments.
Figure 7E:
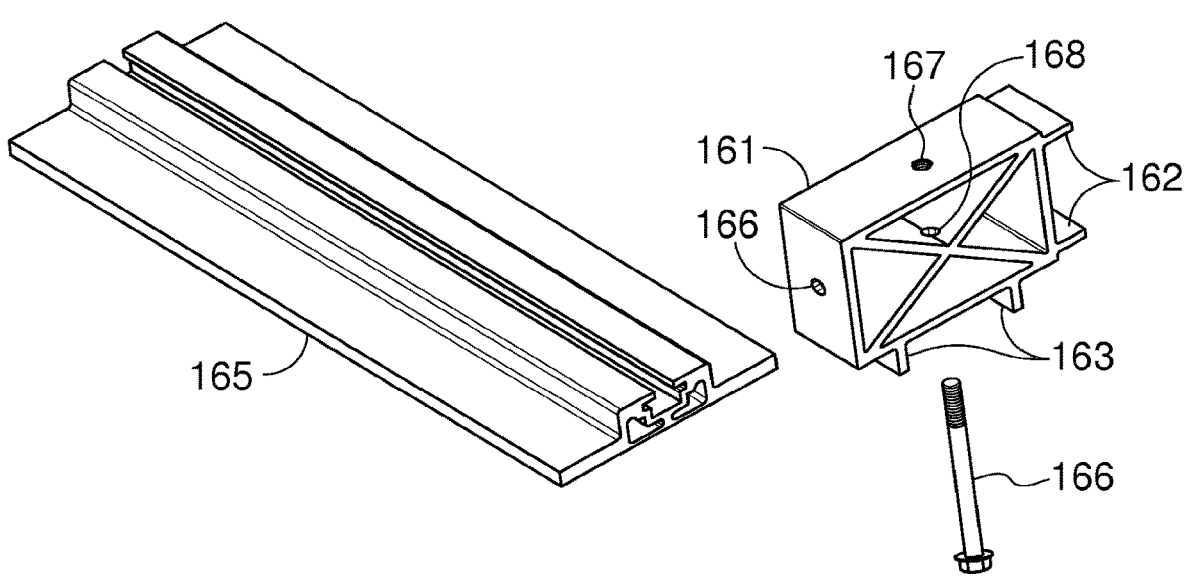
FIG. 7E illustrates a second exploded view of the track-mounted rectangular base, in accordance with some embodiments.
Figure 7F:
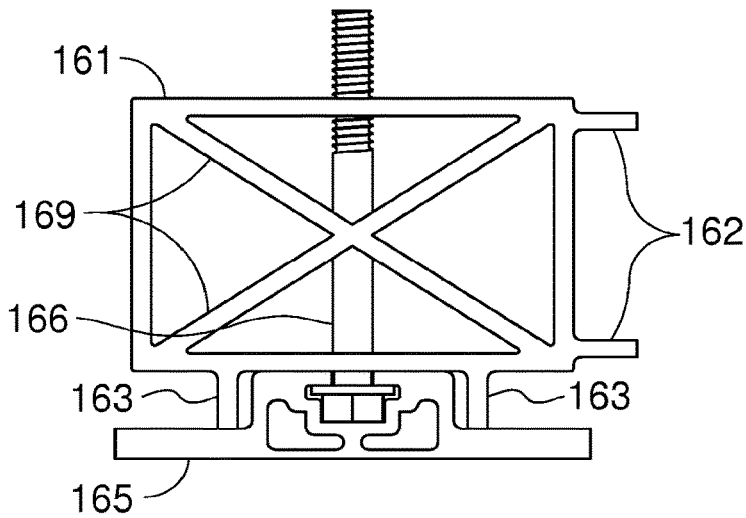
FIG. 7F illustrates a second side view of the track-mounted rectangular base, in accordance with some embodiments.

FIGS. 7D and 7E illustrate second perspective and second exploded views of track-mounted rectangular base 160 employed differently than as shown in FIGS. 7A though 7C A second side view of track-mounted rectangular base 160 as employed in FIGS. 7D and 7E is illustrated in FIG. 7F. Here, base 161 engages track 165 with fastener 166 extending through apertures 167 of the long sides and aperture 168, where inner surfaces of the pair of short-sided legs 163 are placed adjacent to the outer surfaces of track 165 and/or the distal ends of long-sided legs 163 contact the upper surface the track 165.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A surface mount assembly for mounting to a solar panel frame to an installation surface, comprising:

a base configured with at least one aperture;

a track;

a plate configured with a raised portion, wherein the raised portion includes at least one aperture extending away from a surface of the raised portion; and a fastener assembly configured for coupling the base to the track and comprised of a first fastener, a second fastener, and a spacer, wherein the first fastener extends upwardly from the track to threadably engage a threaded aperture of a first end of the spacer, and wherein the second fastener extends downwardly through one base aperture and one plate aperture to threadably engage a threaded aperture of a second end;

wherein the second fastener is comprised of a threaded cap and a threaded insert, wherein the threads of the second fastener are first threads of the threaded insert, and wherein second threads of the threaded insert engage threads of the threaded cap.

2. The surface mount assembly of claim 1, wherein the track is coupled to an installation surface.

3. The surface mount assembly of claim 1, wherein the base is L-shaped, wherein a horizontal arm of the L-shaped base is configured with the one base aperture.

4. The surface mount assembly of claim 1, wherein the threaded aperture of a first end and the threaded aperture of a second end are a same aperture or individual apertures.

5. The surface mount assembly of claim 1, wherein the threaded cap is further comprised of a first portion and a second portion, wherein threads of the threaded cap are located in the first portion.

6. The surface mount assembly of claim 5, wherein an outer surface of the second portion is conically flared.

7. The surface mount assembly of claim 5, wherein the first portion and the second portion are tiered.

8. The surface mount assembly of claim 1, wherein the one plate aperture is a threaded aperture extending substantially perpendicularly away from the surface of the raised portion, wherein the second threads of the threaded insert further engage threads of the threaded aperture.

9. The surface mount assembly of claim 8, wherein a second plate aperture is a threaded aperture extending substantially perpendicularly away from the surface of the raised portion.

10. The surface mount assembly of claim 8, further comprising:

a threaded cap configured to threadably engage the second plate aperture.

11. The surface mount assembly of claim 10, wherein the threaded cap is comprised of an outer shell, and a concentric, threaded cylindrical member extending substantially perpendicularly from a horizontal inner surface of the outer shell and substantially parallel to a cylindrical vertical inner surface of the outer shell to form a cylindrical groove for covering a cylindrical wall of the second plate aperture.

* * * * *